United States Patent [19]

Schanz

[11] Patent Number: 5,634,757
[45] Date of Patent: Jun. 3, 1997

[54] FASTENING DEVICE FOR A TOOL OR WORKPIECE

[76] Inventor: Manfred Schanz, Talstrasse 4, D-79650 Schopfheim, Germany

[21] Appl. No.: 513,326

[22] Filed: Aug. 10, 1995

[30] Foreign Application Priority Data

Aug. 10, 1995 [DE] Germany .................. 44 28 310.5

[51] Int. Cl.$^6$ ................... F16B 43/00; B25G 3/28
[52] U.S. Cl. .................. 411/535; 411/537; 411/544; 403/354; 403/364
[58] Field of Search ..................... 411/160, 161, 411/149, 150, 368, 544, 535, 539, 537; 403/13, 14, 333, 334, 354, 364, 375, 383

[56] References Cited

U.S. PATENT DOCUMENTS

| | | | |
|---|---|---|---|
| 1,450,625 | 4/1923 | Alexander | 411/535 |
| 3,726,510 | 4/1973 | Davis et al. | 403/354 X |
| 4,074,946 | 2/1978 | Swearingen | 403/364 |
| 5,017,038 | 5/1991 | Kurosaki | 403/375 X |

*Primary Examiner*—Neill R. Wilson
*Attorney, Agent, or Firm*—Tarolli, Sundheim, Covell, Tummino & Szabo

[57] ABSTRACT

The fastening of two parts (1 and 3) to one another, e.g. of a tool or workpiece, on a holder provides that the two parts (1 and 3) to be fastened together have adjoining fitting areas (4 and 5) when in use and are braced against one another by fastening means, e.g. a single fixing screw (2), extending diagonally or at right angles to the contact plane of these fitting areas (4 and 5). In this case, in addition to the fitting areas (4 and 5) fixing the reciprocal axial position in Z direction, fitting projections (9) are provided on the one part and fitting recesses (10) on the other part which prevent the parts (1 and 3) connected and braced with one another from shifting diagonally to the fastening means within the contact plane of fitting areas (4 and 5) and which center the two parts (1 and 3) diagonally to this contact plane in X and Y direction so as to fit accurately. The fitting projections (9) are thereby on an area (11) which can deviate elastically, or is flexible, in axial direction against a deformation force which can be applied by the screw (2), of the part (1 or 3) on which they are located, so that the fitting projections (9) engage so as to fit accurately in the fitting recesses (10) before the fitting areas (4 and 5) come in contact. By tightening the fastening means more, fitting areas (4 and 5) then also come into reciprocal contact without the need for an additional part for adjusting or centering in X and Y direction.

17 Claims, 2 Drawing Sheets

FASTENING DEVICE FOR A TOOL OR WORKPIECE

BACKGROUND OF THE INVENTION

The present invention concerns a fastening device for a tool or workpiece according to the claims.

Fastening devices of this type are known and used, for example, for adjusting an electrode holder or electrode on a chuck so as to fit accurately.

A fastening device of this type is known from EP 0 111 092 B2 in which a plate with recesses is provided between the two parts to be fastened together for centering in the X and Y directions, whereby the edges of the recesses of the plate yield vis-à-vis the centering projections of the one part until the two parts come into contact on the designated fitting areas in order to also bring about an alignment and adjustment in the Z axis, i.e. the longitudinal central axis of the entire arrangement. Thus, the noted shim is required to attain the accurately fitting contact, adjustment and alignment in each of the three different directions mentioned. However, said shim increases the cost of manufacturing and assembly as well as the overall height of the entire arrangement.

SUMMARY OF THE INVENTION

It is the object of the invention to create a fastening device of the aforementioned type for two parts with which a precise centering or adjustment is possible in both the X and Y directions while simultaneously enabling an accurately fitting reciprocal contact in the Z direction without the necessity of additionally making a shim and installing it so as to fit accurately. Any other type of additional auxilary part for the accurately fitting contact, while simultaneously centering or adjusting, is to be avoided. Nevertheless, when in use, the fitting areas are to abut firmly and without danger of the two parts to be fastened together tipping and simultaneously centered or adjusted in the X and Y directions, i.e. it should be possible for the fitting projections to be completely engaged when the contact surfaces adjoin, however, they should not prevent the ultimate contact of these fitting areas.

The solution of this apparently contradictory object consists therein that the fitting projections on one of the parts are arranged between the contact surfaces and that the other part to be connected with it has fitting recesses at corresponding points which, when fastened together, engage in one another so as to fit accurately and lock positively, and that the fitting projections are provided in an area of the part on which they are located which can elastically deviate, or is flexible, in the axial direction against a deformation force.

If the parts thus constructed are fastened to one another and braced with one another, the fitting projections engage in the fitting recesses prior to the contact surfaces abutting. By increasing the axial tension or mounting force, it can nevertheless be attained, without a shim or the like, that the contact surfaces abut in a desired manner, that is inclinations of the two parts are also prevented because the fitting projections, or the areas equipped with these, bringing about the centering or adjustment in the X and Y directions, yield somewhat in clamping direction. Thus, the parts to be connected can enable a firm abutment of the contact surfaces due to the deviating or flexible areas at the fitting projections when the fitting projections and fitting recesses engage in their final position so as to be positively locked without any additional parts being required.

Embodiments of the invention are described in greater detail in the following with reference to the drawings having the essential features of the invention, showing, partially in schematic representation:

DESCRIPTION OF THE PREFERRED EMBODIMENT

Figure 1:
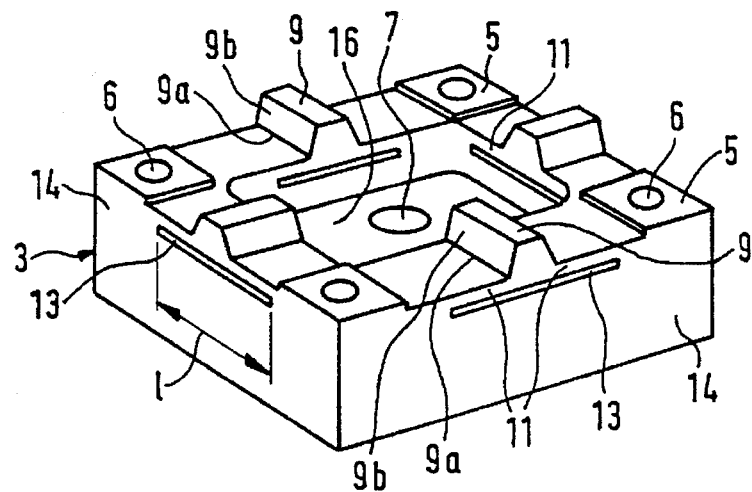
FIG. 1 in graphic representation, a holder to which a tool or workpiece can be fastened, with an inclined view from the top onto the fitting areas arranged in the corners and fitting projections arranged between them, FIG. 2 in a graphic representation, a holder as in FIG. 1 shown in reverse vis-à-vis FIG. 1, and the tool or workpiece to be connected therewith and fastened thereon just prior to the connection and adjustment, in which it is indicated that a flexible area provided in the area of the fitting projections can be formed by a slot and/or a recess, FIG. 3 a partially sectional side view of the fastening device after assembling the workpiece or tool and the holder prior to the fitting areas coming in contact, and FIG. 4 a side view with fitting areas which are in contact after tightening of the fixing screw, in which the deformation of the flexible area is shown in an exaggerated manner for better understanding.

A fastening device for a tool or workpiece, an electrode in this embodiment, with which other workpieces can be worked which in turn, however, must also first be worked as a workpiece and represents a first part 1 of the fastening device, has, according to FIG. 3, a central tightening screw 2, also simply called screw 2 in the following, in order to be able to mount the noted first part 1 on a holder 3 as second part, also called part 3. In this case, the two parts 1 and 3 to be fastened together each have, when in use, fitting areas 4 and 5 adjoining one another in a common plane which can, according to FIGS. 1 and 2, perhaps have additional screw holes 6 for a further fastening. Usually, however, the central screw opening 7 on holder 3 and the threaded hole 8 on the workpiece or part 1 is sufficient to attain a sufficiently secure fastening with screw 2, because the fitting areas 4 and 5 result in an accurate reciprocal position in axial direction and diagonally or at right angles to the screw 2 when they are braced vis-à-vis one another. In this case, fitting projections 9 are provided at the fastening point formed by the surfaces facing one another in addition to the fitting areas 4 and 5 fixing the reciprocal axial position. The fitting projections 9 prevent parts 1 and 3, joined together, from shifting diagonally to the fastening means within the contact plane of the fitting areas 4 and 5 and center the two parts 1 and 3 so as to fit accurately, also diagonally to this contact plane in the X and Y directions.

For this purpose, the fitting projections 9 are situated on part 3 between the contact surfaces 5 and part 1 which has fitting recesses 10 at corresponding points. When they are fastened together, as per FIGS. 3 and 4, the fitting projections 9 and fitting recesses 10 engage in one another so as to fit accurately and, in part, lock positively and ensure a reciprocal adjustment and centering of the two parts 1 and 3.

Figure 3:
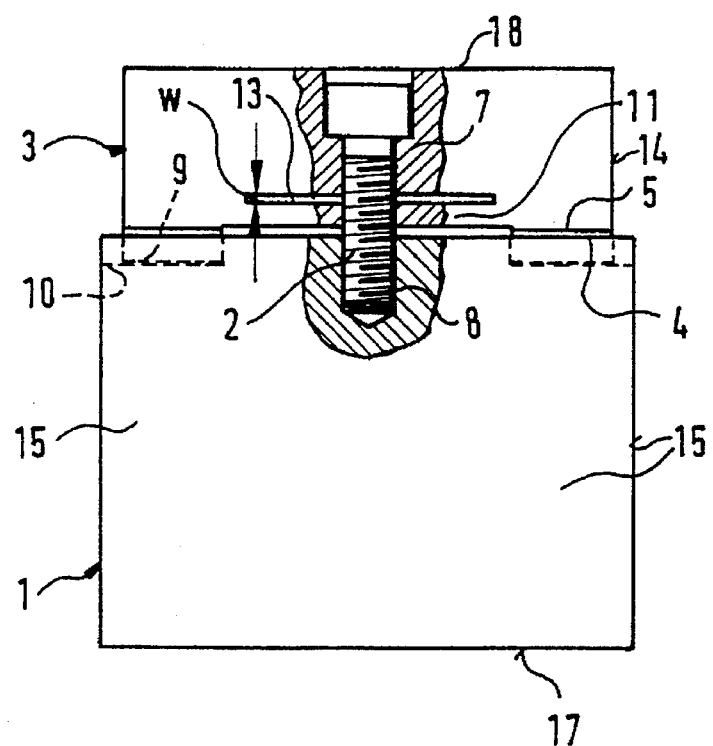

FIG. 3 thereby shows the arrangement in which the fitting projections 9 engage, and lock positively in, the fitting recesses 10. It can be seen that the fitting areas 4 and 5 are still spaced from one another in this position, that is they are not in contact, so that a reciprocal tipping of parts 1 and 3 would be possible.

In order to ensure that a stronger tightening of the fastening element, namely screw 2 or several screws, can result in maintaining the adjustment and centering in the X and Y directions, but nevertheless also produced in the Z direction by contact of fitting areas 4 and 5, the fitting projections 9 are each provided on an area 11 of part 3 which can deviate elastically, or is flexible, against a deformation force in axial direction, i.e. in direction of the slope of the fixing screw 2. It would also be feasible to place the fitting recesses 10 in addition or in place of the fitting projections 9 on such a flexible area of the part 1 on which they are located. However, most often it is more advantageous if the fitting projection 9 can deviate somewhat in axial direction because it is itself not deformed as a result, which is not quite precluded in a fitting recess.

When the fitting projections 9 engage in the fitting recesses 10, as shown in FIG. 3, the fitting areas 4 and 5 are thereby spaced from one another a distance which is equal to or less than the flexibility of the deviating area 11. It is thereby assured that, when the screw 2 is tightened in the area of the fitting projections 9 and fitting recesses 10 already adjoining one another in axial direction, there is such great flexibility that fitting areas 4 and 5 can also be brought together.

Figure 4:
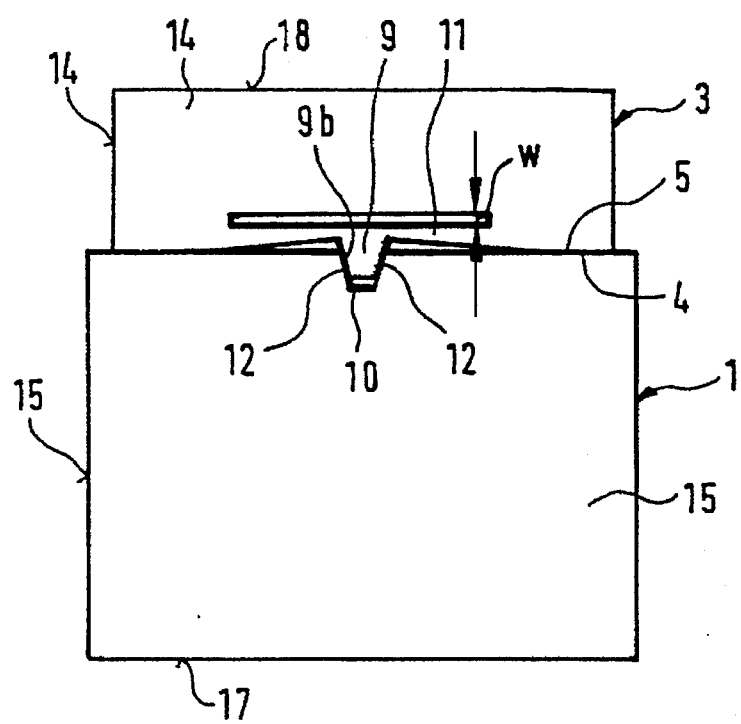

If, therefore, screw 2 is tightened more in the position shown in FIG. 3, the flexible area 11 is deformed somewhat in axial direction as per FIG. 4 and, while maintaining the centering and adjustment between the fitting projections 9 and fitting recesses 10, fitting areas 4 and 5 also come to adjoin or contact one another, and ensure a reciprocal alignment of parts 1 and 3, so that the adjustment in Z direction is also attained.

In this embodiment, the fitting projections 9 are wedge-shaped in cross-section, i.e. they have a trapezoidal cross-section, that is they taper from their base 9a in vertical direction. The fitting recesses 10 have, in conformity with this shape of the fitting recesses, diagonally arranged counter surfaces 12 which, when in use, adjoin the flanks 9b of the fitting projections 9 extending diagonally in cross-section so as to be flat, as can be clearly seen in FIG. 4. This results in the best possible centering and adjustment in the direction of the separating or contact plane between the two parts i and 3, that is diagonally to the Z axis or to the center axis and to the screw 2.

If necessary, the fitting projections 9 could also have a circular or semicircular cross-section which can interact either with diagonal counter surfaces 12 or similarly shaped counter surfaces.

The flexibility of area 11 is created thereby that a recess 13a or hollow is provided adjacent to each of the gripping projections 9 in the clamping direction. In the embodiment of FIGS. 1, 3, and 4, a slot 13 extends parallel to the fitting area 5 which separates the area 11 of part 3 having the respective fitting projection 9 from the remaining area of this part 3 in an otherwise one-piece connection. Above all, FIG. 4 illustrates that the size of this slot 13 extending in clamping direction, i.e. the width w of the slot, is elastically reduced directly below or above the fitting projection 9 especially in the center of the slot as a result of the clamping action. The recess 13a, hollow or slot 13 is therefore arranged in clamping direction behind these fitting projections 9 on the part 3 having the fitting projections 9 in each case. The lateral expansion or length 1 of the slots 13 diagonally to the slope of the radial fitting projections 9 is thereby larger than the width of the fitting projections 9 at its base 9a in this direction, which can be clearly seen in FIGS. 1, 2 and 4. This results in a sufficiently long enough area 11 in order to enable it to yield elastically when the entire fastening device is braced with the aid of screw 2 while reducing the width w of the slot. The length 1 of slot 13 or recess 13a diagonally to the extension of the fitting projections 9 can be about three to five times the width of the fitting projections 9 at its base 9a in each case, in order to obtain a sufficient spring action, elasticity or flexibility of area 11 while nevertheless having sufficient firmness to maintain the adjustment and centering.

Figure 2:
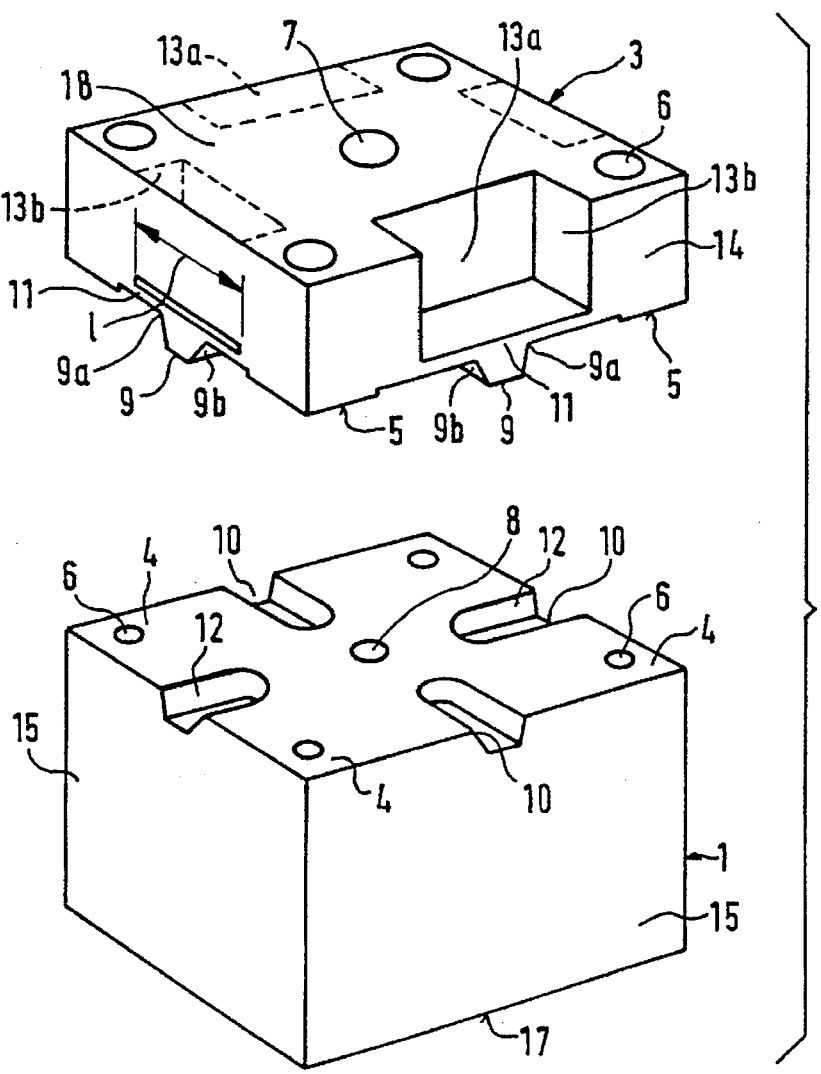

It is indicated in FIG. 2, that a recess 13a can be provided in place of a slot 13. Moreover, recesses 13a can be provided on all flexible areas 11 as indicated by broken lines in FIG. 2.

According to FIG. 2, these recesses 13a are thereby open on the upper side 18 facing away from the fitting projection 9 and the lateral boundary walls 13b extend parallel to one another and at right angles to the lateral surfaces 14 and the upper side 18. In the event that such recesses 13a are arranged below the fitting recesses 10, these could extend in a similar manner up to a corresponding underside 17 of part 1.

Moreover, it would be feasible that slots 13 be provided on opposite sides and recesses 13a in each case on the other two opposite sides. This is almost a special case for a slot in which the border of the slot facing away from the flexible area 11 is virtually left out or omitted. Nevertheless, when the two parts i and 3 are fastened together, an elastic deformation of the area 11 essentially results, as also shown in FIG. 4. However, part 3 has a lower weight.

According to FIGS. 1 and 2, fitting projections 9 have a longitudinal shape and extend from the edge or lateral surface 14 of the part 3 on which they are located in direction toward its center and end before this center. The fitting recesses 10 are oriented in the same way and direction according to FIG. 2 and open at the edge in the area of the lateral surfaces 15 of part 1. In this case, the fitting projections 9 are prismatic centering gibs or centering gib pieces which, according to FIG. 1, are uniformly distributed about the periphery of part 3 and which extend radially to the lateral surfaces 14 and the corresponding edges in a part which is round in cross-section and at right angles in the rectangular or square part of the embodiment shown.

At least two, or two each, fitting recesses 10 ending on opposite lateral surfaces 15, which also align in this embodiment (which does not necessarily have to be the case) can also be connected to one another to form a fitting recess which passes through e.g. the center, the end areas of which then interact accordingly with the fitting projections 9. This enables one to make such opposite fitting recesses in a single step.

In this case, these gib-like fitting projections 9 and, accordingly, also the fitting recesses 10 are arranged on lines crossing one another at right angles, so that reciprocal heat motions are also not hindered due to the construction of the fitting recesses 10 with open edges. Such heat motions can occur when part 1 is machined as a workpiece or when it is later used as a tool as electrode. The arrangement of the even fitting areas 4 and 5 as well as fitting projections 9 and fitting recesses 10 to one another thus result in an adjustment in the X, Y, and Z directions, as well as in he direction of rotation about the central middle axis of the entire arrangement, but do not, in spite of this, hinder lateral heat expansions and heat motions.

The part 3 having slots 13 or recesses 13a to form the flexible area 11 has a cavity 16 arranged in the middle in which slots 13 or recesses 13a end so as to be open and the slots 13 or recesses 13a are also open toward the lateral surfaces 14, i.e. formed continuous on the whole, so that they enable the flexibility of area 11 shown in FIG. 4. In order to thereby maintain an adjusting and centering surface which is as large as possible, the fitting projections 9 extend over the entire width of the slotted area reaching from the outer side 14 to the cavity 16. The fitting projections 9 thus have a length which corresponds to the total width of the slots 13 or recesses 13a. This also results in deformation conditions which are as uniform as possible when the entire fastening device is braced and when the fitting areas 4 and 5 are pressed together.

It should also be noted that the thickness of the material of area 11 situated between slots 13 or recesses 13a and the fitting projections 9, and if applicable, the fitting recesses 10, should be selected such that a deformation in the clamping direction requires a force of at least approximately 200N per fitting projection 9. This enables the fit in the area of the fitting projection 9 to be maintained despite this flexibility.

The fastening of the two parts 1 and 3 together, e.g. of a tool or workpiece, on a holder provides that the two parts 1 and 3 to be fastened together have adjoining fitting areas 4 and 5 when in use and are braced against one another by fastening means, e.g. a single fixing screw 2, extending diagonally or at right angles to the contact plane of these fitting areas 4 and 5. In this case, in addition to the fitting areas 4 and 5 fixing the reciprocal axial position in Z direction, fitting projections 9 are provided on the one part and fitting recesses 10 on the other part which prevent the parts 1 and 3 connected and braced with one another from shifting diagonally to the fastening means within the contact plane of fitting areas 4 and 5 and which center the two parts 1 and 3 diagonally to this contact plane in the X and Y directions so as to fit accurately. The fitting projections 9 and/or the fitting recesses 10 are thereby on an area 11 which can deviate elastically, or is flexible, in the axial direction against a deformation force which can be applied by screw 2, of the part 1 or 3 on which they are located, so that the fitting projections 9 engage so as to fit accurately in the fitting recesses 10 before the fitting areas 4 and 5 come in contact. By tightening the fastening means more, fitting areas 4 and 5 then also come into reciprocal contact without the need for an additional part for adjusting or centering in X and Y direction.

The embodiments of the invention in which an exclusive property or privilege is claimed are defined as follows:

1. A fastening device for fastening a first part (1) on a second part (3), whereby the two parts to be fastened together have adjoining fitting areas (4, 5) which when fastened together are braced against one another in a contact plane by fastening means which extends diagonally or at right angles to the contact plane of said fitting areas (4, 5), in which, fitting projections (9) are provided on said parts to prevent the parts (1, 3) fastened to one another from shifting diagonally relative to the fastening means or within the contact plane of the fitting areas (4,5) and center the two parts (1, 3) diagonally to the contact plane in the X and Y directions extending transversely on the contact plane, so as to fit the parts accurately together, characterized therein that the fitting projections (9) are arranged on one of the parts between the fitting areas, and the other part to be connected with it has fitting recesses (10) at corresponding points which, when said projections and recesses are fastened together, engage each other so as to be locked positively and fit accurately together, and that the fitting projections (9) are provided on an area (11) which can elastically deviate, or is flexible, axially against a deformation force of the part on which they are located.

2. Device according to claim 1, characterized therein that the fitting surfaces (4, 5) are spaced from one another when the fitting projections (9) engage in the fitting recesses (10), the distance between them being equal to or less than the flexibility of the deviating area (11).

3. Device according to claim 2 characterized therein that the fitting projections (9) are wedge-shaped or curved or circular in cross-section or provided with a trapezoidal or semicircular cross-section and the fitting recesses (10) have counter surfaces (12) arranged diagonally in conformity.

4. Device according to claim 1, characterized therein that the fitting projections (9) are wedge-shaped or curved or circular in cross-section or provided with a trapezoidal or semicircular cross-section and the fitting recesses (10) have counter surfaces (12) arranged diagonally in conformity.

5. Device according to claim 4, characterized therein that a recess (13a) adjacent to the fitting projection in clamping direction, hollow and/or a slot (13) extending especially parallel to the fitting areas (5) is provided which separates the area (11) of the part (3) exhibiting the fitting projection (9) from the remaining part of these parts and that the size of this hollow, recess (13a) or slot (13) extending in clamping direction can be elastically reduced by the clamping action.

6. Device according to claim 5, characterized therein that the recess (13a), hollow or slot (13) are arranged on the part (3) having the fitting projections (9) in clamping direction behind these fitting projections (9).

7. Device according to claim 6, characterized therein that the fitting projections have a longitudinal shape and extend, in particular, in direction of its centre from the edge of the part (3) on which they are located and end before the center and that the fitting recesses (10) are oriented in the same way and open at the edge.

8. Device according to claim 7, characterized therein that the fitting projections (9) are prismatic centering gibs which are distributed uniformly about the periphery of the part (3) and extend radially to the lateral surfaces (14) in a part with a round cross-section and at right angles in a rectangular part.

9. Device according to claim 8, characterized therein that the gib-like fitting projections (9) and the fitting recesses (10) are arranged on lines crossing one another at right angles.

10. Device according to claim 9, characterized therein that the part (3) with the recesses (13a) or slots (13) for forming the flexible area (11) has an essentially centred cavity (16) into which the recesses (13a) or slots (13) open and that the slots (13) or recesses (13a) open toward the lateral surfaces (14).

11. Device according to claim 10, characterized therein that the fitting projections (9) extend over the entire side of the slotted area reaching from the outer side (14) to the cavity (16).

12. Device according to claim 11, characterized therein that the lateral expansion or length (1) of the slot (13) or recess (13a), diagonally to the slope of the fitting projections (9), is greater than the width of the fitting projections (9) in this direction.

13. Device according to claim 12, characterized therein that the thickness of the material of the flexible area (11), between the slot (13) or recess (13a) and the fitting projection (9), is such that a deformation in clamping direction requires a force of at least about 200N per fitting projection (9).

14. Device according to claim 13, characterized therein that the length (1) of the slot (13) or the recess (13a), diagonally to the extension of the fitting projection (9), is about three to five times the width of the fitting projection (9) at its base (9a).

15. Device according to claim 14, characterized therein that the recesses (13a) are open on the upper side (18) or underside (17) facing away from the fitting projection (9) or fitting recess (10) and that its lateral border walls (13b) extend parallel to one another and/or at right angles to the lateral surfaces (14, 15) or to the upper side (18) or underside (17).

16. Device according to claim 15, characterized therein that at least two fitting recesses (10) opening on opposite lateral surfaces (15) are in alignment with one another and/or connected with one another to form a fitting recess passing through the center.

17. Apparatus comprising two parts to be fastened together, said parts having adjoining fitting areas (4, 5) when fastened together which are braced against one another in a contact plane, fastening means extending diagonally or at right angles to the contact plane of said fitting areas (4, 5) to hold said fitting areas against one another, said fitting areas having fitting projections (9) on one part and fitting recesses on the other part which prevent said parts (1, 3) when they are held against one another, from shifting diagonally relative to said fastening means or within the contact plane of said fitting areas (4, 5), each of said fitting projections engaging a corresponding recess to center said parts (1, 3) diagonally to the contact plane, in directions which extend transverse to each other on the contact plane, so as to fit said parts together accurately when said parts are fastened together, said fitting projections (9) being provided on an area (11) which can elastically deviate, or is flexible, axially against a deformation force of said part on which they are located.

\* \* \* \* \*